United States Patent [19]

Neumann

[11] 3,843,668

[45] Oct. 22, 1974

[54] CERTAIN 4-SUBSTITUTED AMINO-2,1,3-BENZOTHIADIOZOLES

[75] Inventor: Peter Neumann, Berne, Switzerland

[73] Assignee: Sandoz-Wander Inc., Hanover, N.J.

[22] Filed: May 8, 1973

[21] Appl. No.: 358,274

[30] Foreign Application Priority Data
May 9, 1972 Switzerland.......................... 6865/72

[52] U.S. Cl. ............................... 260/304, 424/270
[51] Int. Cl. ...................... C07d 91/68, C07d 99/10
[58] Field of Search .................................... 260/304

[56] References Cited
UNITED STATES PATENTS
3,029,248  4/1962  Hoffmann et al................... 260/304
3,501,285  3/1970  Baldwin............................. 260/304

*Primary Examiner*—R. Gallagher
*Attorney, Agent, or Firm*—Gerald D. Sharkin; Robert S. Honor; Thomas O. McGovern

[57] ABSTRACT

This invention concerns novel 2,1,3-benzothiadiazole derivatives of the formula:

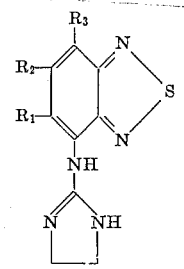

wherein each of $R_1$, $R_2$ and $R_3$, independently, is hydrogen, halogen, alkyl, alkoxy, nitro, cyano, hydroxy or alkylthio, useful as anti-tremor and anti-rigor agents.

29 Claims, No Drawings

CERTAIN 4-SUBSTITUTED AMINO-2,1,3-BENZOTHIADIOZOLES

The present invention relates to 2,1,3-benzothiadiazole derivatives.

The present invention provides compounds of formula I,

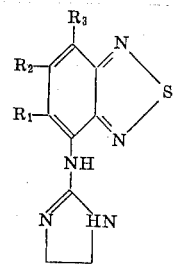

wherein each of $R_1$, $R_2$ and $R_3$, independently, is hydrogen, halogen, alkyl, alkoxy, nitro, cyano, hydroxy or alkylthio, each of the alkyl groups thereof having 1 to 4 carbon atoms.

In formula I halogen preferably signifies bromine or chlorine.

The compounds of formula I are capable of tautomerism. One tautomeric form is represented by the formula I$a$,

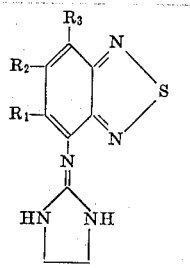

wherein $R_1$, $R_2$ and $R_3$ are as defined above.

For the sake of simplicity, reference is hereafter made to formula I or the appropriate corresponding chemical name when referring to a compound mentioned above, but it is not intended that the invention be limited to the compound in the particular form depicted in formula I or defined by a corresponding chemical name. It will furthermore be appreciated that structurally analogous compounds to compounds of formula I are likewise capable of tautomerism and similar considerations apply thereto. Compounds of formula I, wherein at least one of $R_1$, $R_2$ and $R_3$ is hydroxy may undergo keto-enol tautomerism.

Further, in accordance with the invention, a compound of formula I may be obtained by a process comprising a. reacting a compound of formula II,

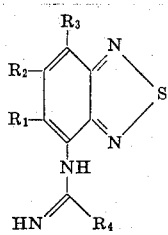

wherein $R_1$, $R_2$ and $R_3$ are as defined above, and $R_4$ is a reactive group other than halogen, capable of being split off with a hydrogen atom of an amine, with ethylene diamine, or b. reacting a compound of formula IV,

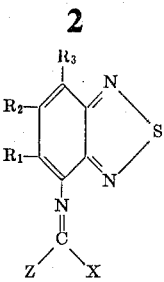

wherein $R_1$, $R_2$ and $R_3$ are as defined above, and each of

X and Z is, independently, a reactive group capable of being split off with the hydrogen atom of an amine with the proviso that when X is halogen Z is halogen, with ethylene diamine, or c. subjecting a compound of formula V,

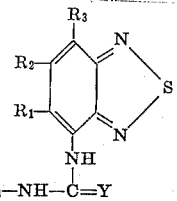

$NH_2$—$CH_2$—$CH_2$—$NH$—$C$=$Y$    V wherein $R_1$, $R_2$ and $R_3$ are as defined above, and Y is oxygen or sulphur, to a ring closure, or d. reacting a compound of formula VI,

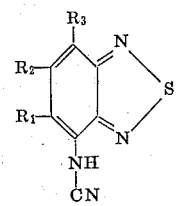

wherein $R_1$, $R_2$ and $R_3$ are as defined above, with ethylene diamine, or e. halogenating a compound of formula I$b$,

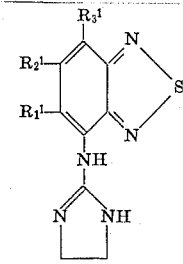

wherein $R_1^1$, $R_2^1$ and $R_3^1$ are as -yl-amino)-$R_1$, $R_2$ and $R_3$ with the proviso that at least one of $R_1^1$, $R_2^1$ and $R_3^1$ is hydrogen, to produce a compound of formula I$c$,

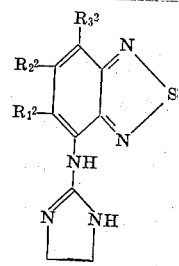

wherein $R_1^2$, $R_2^2$ and $R_3^2$ are as defined above for $R_1$, $R_2$ and $R_3$ with the proviso that at least one of $R_1^2$, $R_2^2$ and $R_3^2$ is halogen.

Process variants a, c and d are the preferred processes.

Process variant a may be effected as follows:

In the compound of formula II the reactive group $R_4$ conveniently is —NH—$NO_2$, or —S—$R_5$, —O—$R_5$ or especially —NH—$R_5$, wherein $R_5$ is hydrogen or alkyl of 1 to 3 carbon atoms. The reaction is conveniently effected at a temperature from 50 to 200°C, preferably from 110 to 170°C. The reaction is conveniently effected in an inert solvent such as an alcohol of 1 to 8 carbon atoms, e.g. methanol, ethanol or amyl alcohol, conveniently in the presence of water, or a mixture of two or more of the foregoing alcohols, e.g. a mixture of methanol and ethanol, or dioxane, nitromethane or nitrobenzene. Alternatively, the reaction is conveniently effected in excess ethylene diamine. The ethylene diamine may be in free base form or in monoacid addition salt form. Conveniently the compounds of formula II are in free base form when the ethylene diamine used is in monoacid addition salt form.

Monoacid addition salts of ethylene diamine are preferably the hydriodides and tosylates.

Acid addition salts of compounds of formula II are preferably the hydriodides, hydrobromides or hydrochlorides.

Process variant b may be effected as follows:

In the compound of formula IV the reactive groups X and Z may be the same or different. Conveniently both X and Z signify halogen, preferably chlorine. Alternative convenient significances for X and Z are —NH—$NO_2$, or —S—$R_5$, —O—$R_5$ or —NH—$R_5$, wherein $R_5$ is as defined above. The reaction may be conveniently effected in the presence of an excess of ethylene diamine. Alternatively, an inert solvent may be used such as an alcohol of 1 to 8 carbon atoms, for example methanol or ethoxyethanol, dioxane, acetone, nitrobenzene, xylene or toluene. The reaction temperature is conveniently from 0°C to the temperature of the reaction mixture boiling under reflux.

When X or Z in the compound of formula IV is a halogen atom, then the reaction with ethylene diamine liberates hydrogen halide. A corresponding equivalent additional amount of ethylene diamine or a corresponding equivalent amount of an acid acceptor such as an alkali carbonate, an alkali or a tertiary amine is then preferably present.

Process variant c may be effected as follows:

The ring closure of a compound of formula V is conveniently effected in an inert solvent, preferably an alcohol of 1 to 5 carbon atoms such as methanol or ethanol, water or dimethyl formamide. The reaction is conveniently effected at a temperature from 20 to 150°C, preferably from 60 to 110°C. The reaction is conveniently effected in the presence of a base, e.g. an alkaline earth metal hydroxide, an alkali metal hydroxide such as potassium or sodium hydroxide, or a heavy metal compound such as mercury oxide or lead acetate.

Process variant d may be effected as follows:

The reaction is conveniently effected in an inert organic solvent, e.g. an alcohol of 3 to 8 carbon atoms, such as n-pentanol, or an excess of ethylene diamine may be used. The reaction temperature is conveniently from 50 to 200°C, preferably from 110 to 160°C.

The reaction is preferably effected in the presence of an excess of a monoacid addition salt of ethylene diamine.

Process variant e may be effected as follows:

Suitable halogenation agents for replacing a hydrogen atom in the compound of formula Ib by a halogen atom include chlorine, bromine, sulphuryl chloride or N-bromosuccinimide. The reaction is conveniently effected in an inert solvent, preferably a halogenated hydrocarbon such as methylene chloride, chloroform, carbon tetrachloride or ethylene chloride, glacial acetic acid, dioxane, acetonitrile, tert.butyl amine, ethylene diamine or water. The reaction temperature is conveniently from −20 to +120°C. The reaction is conveniently effected in the presence of a base, e.g. an alkali carbonate or a tertiary amine.

The compound of formula Ib may be conveniently in acid addition salt form.

The resulting compounds of formulae I and Ic may be isolated from the reaction mixture in known manner, e.g. by extraction, precipitation or acid addition salt formation, and may be purified in known manner, e.g. by recrystallization.

The compounds of formula II used as starting materials in the process variant a, may be obtained as follows:

a'. An 4-amino-2,1,3-benzothiadiazole of formula III,

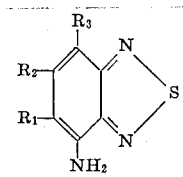

III wherein $R_1$, $R_2$ and $R_3$ are as defined above, may be reacted with benzoyl chloride and ammonium thiocyanate in, for example, acetone at a temperature from −10 to +60°C. The resulting N-benzoyl-N'-(2,1,3-benzothiadiazol-4-yl)thiourea may be saponified with an aqueous alkali metal hydroxide solution, conveniently at the boil, to produce a N-(2,1,3-benzothiadiazol-4-yl)thiourea of formula VII,

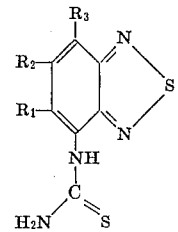

VII wherein $R_1$, $R_2$ and $R_3$ are as defined above, which is a tautomeric form of the compound of formula II wherein $R_4$ is —SH.

b'. The compound of formula VII may be alkylated with an alkyl halide, especially an alkyl iodide conveniently in an alcohol such as methanol, to produce a compound of formula II wherein $R_4$ is -S-alkyl, which may be liberated with a suitable base, e.g. an aqueous alkali metal hydroxide, from the reaction product.

c'. When silver cyanate is used in place of ammonium thiocyanate in process a' above, and after alkylating the resulting compound in alkaline solution, the corresponding compoound of formula II wherein $R_4$ is —O—Alk is obtained.

d'. A compound of formula III may be reacted with methylnitroso-guanidine in known manner to produce a compound of formula II wherein $R_4$ is —NH—$NO_2$, and e'. A compound of formula III may be reacted with cyanamide or an alkyl cyanamide, the alkyl radical thereof having 1 to 3 carbon atoms, in the presence of an acid, in known manner to produce a compound of formula II wherein $R_4$ is —NH—$R_5$.

Compounds of formula II wherein the $R_4$ radical has a significance other than that mentioned above, may be obtained in analogous manner, or known manner.

The compounds of formula III are known or may be produced in known manner.

The compounds of formula IV wherein X and Z are chlorine, used as starting materials in the process variant b, may, for example, be obtained by reacting a 4-amino-2,1,3-benzothiadiazole of formula III with thiophosgene in, preferably 4N, hydrochloric acid, conveniently at room temperature and reacting the resulting 4-isothiocyanato-2,1,3-benzothiadiazole with chlorine gas, preferably in carbon tetrachloride conveniently with slight cooling. The other compounds of formula IV may be obtained in known manner, e.g. using a compound of formula IV wherein X and Z are chlorine as starting material.

The compounds of formula V, used as starting materials in the process variant c, may be produced as follows:

A compound of formula III is reacted with phosgene or thiophosgene, preferably in 4 N hydrochloric acid, conveniently at room temperature, and the resulting 4-isocyanato- or 4-isothiocyanato-thiadiazole is reacted conveniently at room temperature with ethylene diamine in an inert solvent such as chloroform or diethyl ether.

The compounds of formula VI, used as starting materials in the process variant d, may be produced as follows:

A compound of formula VII is dissolved in an aqueous-alkaline medium, e.g. in a solution of an alkali metal hydroxide such as potassium hydroxide in water, the solution is heated to the boil, and a dehydrosulphurizing agent, e.g. a heavy metal salt such as lead acetate, is added to the boiling solution.

Insofar as the production of starting materials is not particularly described, these are known or may be produced and purified in accordance with known processes, or in a manner analogous to the processes described herein or to known processes.

Free base forms of compounds of formula I may be converted into acid addition salt forms in conventional manner, and vice versa. Suitable inorganic acids for acid addition salt formation include the hydrohalic acids, and suitable organic acids include acetic acid and maleic acid.

The compounds of formula I are useful because they possess pharmacological activity in animals. In particular, the compounds of formula I are useful as anti-tremor agents, for example, in the treatment of trembling or shaking conditions in animals as indicated by a tremor antagonism in mice on p.o. administration of 10 to 100 mg/kg animal body weight, of the compounds, in accordance with the following test The evening before the test day the mice used for the test (50% males and 50% females) are deprived of feed. Groups of 10 animals each are used for the test, one goup forming the control group.

The compound to be tested is administered to the animals in each group, the doses increasing from group to group. A physiological common salt solution is given to the animals of the control group. 30 minutes after administration of the compound to be tested, 100 mg/kg animal body weight of the compound producing the tremor (2,6-dichlorophenyl-acetimidoyl ureide) is administered p.o. to all the animals.

5, 10, 15 and 20 minutes after administration of the compound producing the tremor, the animals are judged in accordance with the following scale:

2 = strong tremor
1 = weak tremor
0 = no tremor
Evaluation

For the three first measurements (5, 10 and 15 minutes after administration), the behaviour of each mouse is determined, and the group average values are estimated as follows:

group with strong tremor = averages 1.5–2.0
group with weak tremor = averages 0.5–1.5
group without tremor = averages 0 –0.5

For the above mentioned use the dosage will, of course, vary depending on the compound employed, mode of administration and therapy desired. However, in general, satisfactory results are obtained when administered at a daily dosage of from 0.01 mg to about 100 mg per kg animal body weight, and when administered perorally, at a daily dosage of from 0.1 to 100 mg per kg animal body weight, conveniently given in divided doses 2 to 4 times a day or in sustained release form. For the larger mammals, the total peroral daily dosage is in the range from about 10 to about 400 mg, and dosage forms suitable for oral administration comprise from about 2.5 mg to about 200 mg of the compounds admixed with a solid or liquid pharmaceutical carrier or diluent. For the larger mammals, the total parenteral daily dosage is in the range from about 1 to about 40 mg, and dosage forms suitable for parenteral administration comprise from about 0.2 mg to about 20 mg of the compounds admixed with a liquid pharmaceutical carrier or diluent.

Specific examples of daily dosages, at which satisfactory results are obtained as anti-tremor agents on p.o. administration, are:

i. 4-(2-imidazolin-2-yl-amino)-5-methyl-2,1,3-benzothiadiazole from 0.1 to 100, e.g., 20 to 100, mg/kg animal body weight for animals in general, e.g., a mouse, and for the larger mammals from 10 to 400 mg;

ii. 5-chloro-4-(2-imidazolin-2-yl-amino)-2,1,3-benzothiadiazole from 0.1 to 100, e.g. 40 to 75, mg/kg animal body weight for animals in general, e.g. a mouse, and for the larger mammals from 10 to 400 mg;

iii. 5,7-dimethyl-4-(2-imidazolin-2-yl-amino)-2,1,3-benzothiadiazole, from 0.1 to 100, e.g., 10 to 70, mg/kg animal body weight for animals in general, e.g., a mouse, and for the larger mammals from 10 to 400 mg;

iv. 7-chloro-4-(2-imidazolin-2-yl-amino)-5-methyl-2,1,3-benzothiadiazole, from 0.1 to 100, e.g., 30 to 65, mg/kg animal body weight for animals in general, e.g., a mouse, and for the larger mammals from 10 to 400 mg; and v. 5-chloro-4-(2-imidazolin-2-yl-amino)-7-methyl2,1,3-benzothiadiazole, from 0.1 to 100, e.g., 15 to 80, mg/kg animal body weight for animals in general, e.g., a mouse, and for the larger mammals from 10 to 400 mg.

The compounds of formula I are furthermore useful as anti-rigor agents, for example, in the treatment of rigidity conditions in animals as indicated by a rigor antagonism in rats on i.v. administration of 0.001 to 10 mg/kg animal body weight, of the compounds, in accordance with the following test.

Rats are injected i.p. with 7.5 mg/kg animal body weight of Thalamonal (Registered Trade Mark), whereupon these animals develop a rigor which can be measured with an electromyograph. The dose of active compound which must be injected i.v. in order to inhibit the rigor of the rats is ascertained.

For this use the dosage will, of course, vary depending on the compound employed, mode of administration and treatment desired. However, in general, satisfactory results are obtained, when administered at a daily dosage of from about 0.001 mg to about 50 mg per kg animal body weight, and when administered perorally at a daily dosage of from about 0.1 to about 50 mg per kg animal body weight, conveniently given individed doses 2 to 4 times a day or in sustained release form. For the larger mammals, the total peroral daily dosage is in the range from about 10 to about 400 mg, and dosage forms suitable for oral administration comprise from about 2.5 mg to about 200 mg of the compounds admixed with a solid or liquid pharmaceutical carrier or diluent.

For the larger mammals the total parenteral daily dosage is in the range from about 0.1 to about 40 mg, and dosage forms suitable for parenteral administration comprise from about 0.02 to about 20 mg of the compounds admixed with a liquid pharmaceutical carrier or diluent.

Specific examples of daily dosages, at which satisfactory results are obtained as anti-rigor agents, are:

i. 4-(2-imidazolin-2-yl-amino)-5-methyl-2,1,3-benzothiadiazole from 0.001 to 50 mg/kg, e.g., 0.5 administered i.v., mg/kg, animal body weight, for animals in general, e.g., a rat, and for the larger mammals from 10 to 400 mg, administered p.o.;

ii. 5-chloro-4-(2-imidazolin-2-yl-amino)-2,1,3-benzothiadiazole from 0.001 to 50 mg/kg, e.g., 0.01 to 0.06 administered i.v., mg/kg, animal body weight, for animals in general, e.g., a rat, and for the larger mammals from 10 to 400 mg, administered p.o.;

iii. 5,7-dimethyl-4-(2-imidazolin-2-yl-amino)-2,1,3-benzothiadiazole, from 0.001 to 50 mg/kg, e.g., 0.03 to 0.15 administered i.v. mg/kg, animal body weight, for animals in general, e.g., a rat and for the larger mammals from 10 to 400 mg, administered p.o.;

iv. 7-chloro-4-(2-imidazolin-2-yl-amino)-5-methyl-2,1,3-benzothiadiazole, from 0.001 to 50 mg/kg, e.g., 0.04 to 0.1 administered i.v. mg/kg, animal body weight, for animals in general, e.g., a rat, and for the larger mammals from 10 to 400 mg, administered p.o.;

v. 5,7-dichloro-4-(2-imidazolin-2-yl-amino)-2,1,3-benzothiadiazole, from 0.001 to 50 mg/kg, e.g., 0.03 to 0.2 administered i.v., mg/kg, animal body weight, for animals in general, e.g., a rat, and for the larger mammals from 10 to 400 mg, administered p.o.; and vi. 5-chloro-4-(2-imidazolin-2-yl-amino)-7-methyl-2,1,3-benzothiadiazole, from 0.001 to 50 mg/kg, e.g., 0.004 to 0.03 administered i.v., mg/kg, animal body weight for animals in general, e.g., a rat, and for the larger mammels from 10 to 400 mg administered p.o..

The compounds of formula IIa,

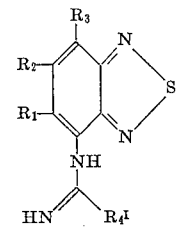

wherein $R_1$, $R_2$ and $R_3$ are as defined above and $R_4{'}$ is —$NHR_5$ wherein $R_5$ is hydrogen or alkyl of 1 to 3 carbon atoms are useful not only as intermediates but also because they possess pharmacological activity in animals. In particular the compounds of formula IIa are useful as anti-tremor agents, for example, in the treatment of trembling or shaking conditions in animals as indicated by a tremor antagonism in mice on p.o. administration of 10 to 100 mg/kg animal body weight of the compounds in accordance with the above-mentioned anti-tremor test.

For the above mentioned use the dosage will, of course, vary depending on the compound employed, mode of administration and therapy desired. However, in general, satisfactory results are obtained when administered at a daily dosage of from 0.01 mg to about 100 mg per kg animal body weight, and when administered perorally at a daily dosage of from 0.1 to 100 mg per kg animal body weight conveniently given in divided doses 2 to 4 times a day or in sustained release form. For the larger mammals, the total peroral daily dosage is in the range from about 10 to about 400 mg, and dosage forms suitable for oral administration comprise from about 2.5 mg to about 200 mg of the compounds admixed with a solid or liquid pharmaceutical carrier or diluent. For the larger mammals, the total parenteral daily dosage is in the range from about 1 to about 40 mg and dosage forms suitable for parenteral administration comprise from about 0.2 mg to about 20 mg of the compounds admixed with a liquid pharmaceutical carrier or diluent.

Specific examples of daily dosages, at which satisfactory results are obtained as anti-tremor agents on p.o. administration, are:

i. 5.7-dimethyl-4-quanidino-2,1,3-benzothiadiazole, from 0.1 to 100, e.g. 60, mg/kg animal body weight for animals in general, e.g. a mouse, and for the larger mammals from 10 to 400 mg; and ii. 7-chloro-4-guanidino-5-methyl-2,1,3-benzothiadiazolo, from 0.1 to 100, e.g. 30 to 100, mg/kg animal body weight, for animals in general, e.g., a mouse, and for the larger mammals from 10 to 400 mg.

The compounds of formula IIa are furthermore useful as anti-rigor agents, for example, in the treatment of rigidity conditions in animals, as indicated by a rigor antagonism in rats on i.v. administration of 0.001 to 10 mg/kg animal body weight, of the compounds, in accordance with the above-mentioned anti-rigor test.

For this use the dosage will, of course, vary depending on the compound employed, mode of administration and treatment desired. However, in general, satisfactory results are obtained when administered at a daily dosage of from about 0.001 mg to about 50 mg per kg animal body weight, and when administered perorally at a daily dosage of from 0.1 to 50 mg/kg animal body weight conveniently given in divided doses 2 to 4 times a day or in sustained release form. For the larger mammals, the total peroral daily dosage is in the range from about 10 to about 400 mg, and dosage forms suitable for oral administration comprise from about 2.5 mg to about 200 mg of the compounds admixed with a solid or liquid pharmaceutical carrier or diluent. For the larger mammals, the total parenteral daily dosage is in the range from about 0.1 to about 40 mg and dosage forms suitable for parenteral administration comprise from about 0.02 to about 20 mg of the compounds admixed with a liquid pharmaceutical carrier or diluent.

Specific examples of daily dosages, at which satisfactory results are obtained as anti-rigor agents, are:
i. 5,7-dimethyl-4-guanidino-2,1,3-benzothiadiazole, from 0.001 to 50 mg/kg animal body weight for animals in general, e.g., a rat, and for the larger mammals from 10 to 400 mg, administered p.o.; and
ii. 5,6-dimethyl-4-guanidino-2,1,3-benzothiadiazole, from 0.001 to 50 mg/kg animal body weight, for animals in general, e.g., a rat, and for the larger mammals from 10 to 400 mg, administered p.o..

The compounds of formula I or IIa may be administered in pharmaceutically acceptable acid addition salt form. Such acid addition salt forms exhibit the same order of activity as the free base forms and are readily prepared in conventional manner. Representative acid addition salt forms include organic acid salt forms such as the hydrogen maleate, fumarate and tartrate and mineral acid salt forms such as the hydrochloride, hydrobromide and sulphate. A pharmaceutical composition may comprise a compound of formula I or IIa, in free base form or in pharmaceutically acceptable acid addition salt form, in association with a pharmaceutical carrier or diluent. Such compositions may be prepared by conventional techniques to be in the form of, for example, capsules, tablets, suppositories, suspensions or solutions, for enteral or parenteral administration. Aside from the usual pharmaceutical diluents or carriers, e.g. water, alcohols, natural or hardened oils and waxes, these pharmaceutical compositions may contain suitable preserving, stabilizing, wetting, solubilizing, sweetening, flavouring or colouring agents.

An example of a tablet composition comprises 40 mg of 4-(2-imidazolin-2-yl-amino)-5-methyl-2,1,3-benzothiadiazole, 70 mg of lactose, 5 mg of maize starch, 5 mg of talc and 0.1 mg of magnesium stearate.

In a preferred class of compounds each of $R_1$, $R_2$ and $R_3$ is, independently, hydrogen, halogen, alkyl, alkoxy, nitro, cyano or alkylthio. In a more preferred class of compounds, $R_2$ and $R_3$ are hydrogen, $R_1$ being especially hydrogen, alkoxy, alkylthio, or more especially alkyl or halogen. 4-(2-Imidazolin-2-yl-amino)-5-chloro-2,1,3-benzothiadiazole has especially interesting properties.

In another preferred class of compounds, one of $R_1$, $R_2$ and $R_3$ is hydrogen and the others of $R_1$, $R_2$ and $R_3$ have the same significance, especially alkyl or halogen.

In another preferred class of compounds, $R_1$ and $R_2$ are hydrogen, $R_3$ being especially hydroxy, alkyl or alkoxy.

In another preferred class of compounds, $R_1$ and $R_3$ are hydrogen, $R_2$ being especially halogen or alkyl.

In the following non-limitative examples all temperatures are indicated in degrees Centigrade, room temperature is between 20 and 30°C, unless otherwise indicated. The chloroform solutions are dried either with sodium sulphate (anhydrous) or Sikkon (Trade Mark).

EXAMPLE 1: 4-(2-imidazolin-2-yl-amino)-2,1,3-benzothiadiazole [Process variant a]

13.4 g of S-methyl-N-(2,1,3-benzothiadiazol-4-yl)isothiuronium iodide are suspended in 30 cc of methanol and 3 cc of ethylene diamine are added to the suspension. The mixture is boiled at reflux for 1 hour. The solvent is then removed by evaporation and the residue is heated to 140° for 2 hours. The cooled product is divided between 200 cc of chloroform and 50 cc of 2 N aqueous sodium hydroxide solution, the organic phase is dried and concentrated by evaporation. After recrystallization from ethyl acetate, the residue yields 4-(2-imidazolin-2-yl-amino)-2,1,3-benzothiadiazole having a M.P. of 192–193°.

The starting material used in this Example is obtained as follows.

19.7 cc of benzoyl chloride are added to a solution of 15 g of ammonium thiocyanate in 200 cc of acetone in an ice bath and the mixture is stirred for 10 minutes. The solution is heated to the boil at reflux for 1 hour together with 20 g of 4-amino-2,1,3-benzothiadiazole, is cooled and diluted with a 4-fold quantity of water. The precipitate is filtered off and is rapidly brought to a boil together with 200 cc of a 2 N aqueous sodium hydroxide solution. After 5 minutes, the solution is cooled and acidified weakly with glacial acetic acid. The precipitate is washed with water, boiled out with a small amount of methanol and washed with ether. The N-(2,1,3-benzothiadiazol-4-yl)thiourea, obtained in this manner, is boiled for 1 hour together with 15 g of methyl iodide in 80 cc of methanol and the mixture is then evaporated to dryness. Crude S-methyl-N-(2,1,3-benzothiadiazol-4-yl)isothiuronium iodide is obtained and is used for the above reaction without further purification.

EXAMPLE 2: 4-(2-imidazolin-2-yl-amino)-5-methyl-2,1,3-benzothiadiazole [Process variant a]

13 g of S-methyl-N-(5-methyl-2,1,3-benzothiadiazol-4-yl)isothiuronium iodide are dissolved in 100 cc of methanol, and a solution of 2.7 cc of ethylene diamine in 20 cc of n-amyl alcohol is added to the solution at room temperature. The mixture is subsequently boiled at reflux for 1 hour. The methanol is then removed by distillation and the residue is heated to 135° for 1 hour. The cooled product is then divided between 300 cc of chloroform and 100 cc of a 2 N aqueous sodium hydroxide solution, the organic phase is dried and concentrated by evaporation. The residue is triturated with 200 cc of ether, is filtered off, recrystallized from methanol with the addition of some active charcoal, whereby 4-(2-imidazolin-2-yl-amino)-5-methyl-2,1,3-benzothiadiazole, having a M.P. of 225–228°, is obtained.

The starting material used in this Example is obtained as follows.

14 cc of benzoyl chloride are added to a solution of 11.5 g of ammonium thiocyanate in 150 cc of acetone in an ice bath and the mixture is then stirred for 10 minutes. This solution is heated to the boil at reflux together with 16 g of 4-amino-5-methyl-2,1,3-benzothiadiazole. The solution is cooled to room temperature and diluted with a 4-fold quantity of water. The precipitate is filtered off and rapidly brought to a boil together with 150 cc of a 2 N aqueous sodium hydroxide solution and kept at the boil for 5 minutes. The solution is cooled to room temperature, is acidified weakly with glacial acetic acid, the precipitate is filtered off, washed with ether and recrystallized from methanol.

The N-(5-methyl-2,1,3-benzothiadiazol-4-yl)thiourea, obtained in this manner, is boiled for one hour together with 12 g of methyl iodide in 200 cc of methanol, and the mixture is then evaporated to dryness. Crude S-methyl-N-(5-methyl-2,1,3-benzothiadiazol-4-yl)isothiuronium iodide is obtained and is used for the above reaction without purification.

EXAMPLE 3: 4-(2-imidazolin-2-yl-amino)-5-chloro-2,1,3-benzothiadiazole [Process variant a]

9.8 g of S-methyl-N-(5-chloro-2,1,3-benzothiadiazol-4-yl)isothiuronium iodide are heated to the boil at reflux for one hour together with 50 cc of methanol and 1.8 cc of ethylene diamine. The solvent is then removed by evaporation and the moist residue is boiled at reflux for 1 hour together with 20 cc of n-amyl alcohol. The mixture is subsequently shaken with 500 cc of chloroform and 150 cc of water until all the material is dissolved. 40 cc of a 2 N aqueous sodium hydroxide solution are added to the aqueous phase and extraction is effected with 200 cc of chloroform. The organic phase is dried and concentrated by evaporation. After recrystallizing the residue from methanol with the addition of some active charcoal, 4-(2-imidazolin-2-yl-amino)-5-chloro-2,1,3-benzothiadiazole, having a M.P. of 221–223°, is obtained.

The starting material used in this Example is obtained as follows.

Proceeding in a manner analogous to that described in Example 2, but using 19 g of 4-amino-5-chloro-2,1,3-benzothiadiazole, N-(5-chloro-2,1,3-benzothiadiazol-4-yl)thiourea is obtained and this is boiled for one hour with 9 g of methyl iodide in 150 cc of methanol. After concentrating by evaporation, crude S-methyl-N-(5-chloro-2,1,3-benzothiadiazol-4-yl)isothiuronium iodide is obtained and is used for the above reaction without further purification.

EXAMPLE 4: 4-(2-imidazolin-2-yl-amino)-5-methoxy-2,1,3-benzothiadiazole [Process variant a]

13.4 g of S-methyl-N-(5-methoxy-2,1,3-benzothiadiazol-4-yl)isothiuronium iodide are dissolved in 150 cc of methanol, and a solution of 2.8 cc of ethylene diamine in 50 cc of amyl alcohol is added to the solution. The resulting mixture is boiled at reflux for one hour. The methyl alcohol is subsequently removed by evaporation and the solution is boiled at a bath temperature of 155° for 1 hour. The solution is then cooled to room temperature. Working up is effected by treating this solution with 120 cc of a 2 N aqueous sodium hydroxide solution and extracting with 300 cc of chloroform. The undissolved residue is filtered off and dissolved in 1 litre of chloroform whilst hot. The organic phases are combined, dried and filtered through active charcoal. The solution is concentrated, whereby 4-(2-imidazolin-2-yl-amino)-5-methoxy-2,1,3-benzothiadiazole, having a M.P. of 231–234°, is obtained.

The starting material used in this Example is obtained as follows.

Proceeding in a manner analogous to that described in Example 2, but using 19 g of 4-amino-5-methoxy-2,1,3-benzothiadiazole, N-(5-methoxy-2,1,3-benzothiadiazol-4-yl)thiourea is obtained and this is boiled for 1 hour together with 14 g of methyl iodide in 300 cc of methanol. After concentrating by evaporation, crude S-methyl-N-(5-methoxy-2,1,3-benzothiadiazol-4-yl)isothiuronium iodide is obtained and is used for the above reaction without further purification.

EXAMPLE 5: 7-chloro-4-(2-imidazolin-2-yl-amino)-2,1,3-benzothiadiazole [Process variant c]

9 g of N-(β-aminoethyl)-N'-(7-chloro-2,1,3-benzothiadiazol-4-yl)thiourea are added to a solution of 1.8 g of potassium hydroxide in 300 cc of methanol. 12 g of lead acetate are added to the mixture, this is stirred and heated to the boil for 1 hour. The solution is then filtered in order to remove the lead sulphide precipitate and is concentrated by evaporation. The residue is taken up in one litre of 1 N hydrochloric acid whilst hot, the solution is filtered through a small amount of active charcoal and rendered alkaline with a concentrated caustic soda solution. The red precipitate obtained in this manner is separated and washed with water. After recrystallization from methanol, this precipitate yields 7-chloro-4-(2-imidazolin-2-yl-amino)-2,1,3-benzothiadiazole, having a M.P. of 212–214°.

The starting material used in this Example is obtained as follows.

9 g of 4-amino-7-chloro-2,1,3-benzothiadiazole are suspended in 450 cc of 4 N hydrochloric acid and 12 g of thiophosgene are added. The mixture is stirred at room temperature for 24 hours and is subsequently filtered. The residue is washed with water, dried and taken up in 1.5 litres of cyclohexane whilst hot. The solution is filtered through 5 g of active charcoal and is concentrated by evaporation. The 7-chloro-4-isothiocyano-2,1,3-benzothiadiazole obtained in this manner, having a M.P. of 134–136°, is dissolved in 500 cc of ether, and a solution of 7 cc of ethylene diamine in 300 cc of ether is added dropwise at room temperature within 5 hours whilst stirring vigorously. The finely crystalline precipitate is drawn off by suction and washed with ether. After recrystallization from ethyl acetate, this precipitate yields N-(β-aminoethyl)-N'-(7-chloro-2,1,3-benzothiadiazol-4-yl)-thiourea, having a M.P. of 148–151°.

EXAMPLE 6: 5-chloro-4-(2-imidazolin-2-yl-amino)-2,1,3-benzothiadiazole [Process variant d]

12 g of 5-chloro-4-cyanamino-2,1,3-benzothiadiazole are heated to the boil at reflux for 2 hours together with 28 g of ethylene-diamine-mono-p-toluenesulphonate in 300 cc of n-pentanol. The solvent is then removed by evaporation. The residue is taken up in 300 cc of methanol whilst hot, the solution is rendered alkaline with a 2 N caustic soda solution, is diluted with a two-fold volume of water and subsequently concentrated to half its volume. The precipitate obtained after cooling is separated, washed with water and stirred twice with 300 cc amounts of ether and filtered. After recrystallization from methanol, 5-chloro-4-(2-imidazolin-2-yl-amino)-2,1,3-benzothiadiazole, having a M.P. of 221–223°, is obtained.

The starting material used in this Example is obtained as follows.

15 g of N-(5-chloro-2,1,3-benzothiadiazol-4-yl)thiourea (M.P. 193–194°) are suspended in 120 cc of water and heated to the boil. The boiling solutions of 35 g of potassium hydroxide in 90 cc of water and of 28 g of lead acetate in 65 cc of water are then added thereto. The mixture is stirred vigorously for 5 minutes and is rapidly filtered. The filtrate is cooled and acidified weakly with glacial acetic acid. The precipitate is 5-chloro-4-cyanamino-2,1,3-benzothiadiazole (M.P. 215–220°), which is used for the above reaction without further purification.

By using the processes described in the above Examples and the corresponding starting materials, the following compounds of formula I are obtained:

| Example | $R_1$ | $R_2$ | $R_3$ | M.P. |
|---|---|---|---|---|
| 7 | H | H | $CH_3$ | 214–217° |
| 8 | $C_2H_5$ | H | H | 175–179° |
| 9 | $CH_3$ | H | Cl | 275–278° |
| 10 | $CH_3$ | H | $CH_3$ | 270–273° |
| 11 | Cl | H | $CH_3$ | 248–268° (hydrochloride hydrate) |
| 12 | Cl | H | Cl | 285–290° |
| 13 | $CH_3$ | $CH_3$ | H | 210–215° |
| 14 | H | H | OH | |
| 15 | Cl | Cl | H | 230–233° |
| 16 | H | Cl | Cl | 232–235° |
| 17 | H | H | $OCH_3$ | 229–233° |
| 18 | Br | H | H | 246–248° |
| 19 | Br | H | Cl | 266–269° |
| 20 | $NO_2$ | H | H | |
| 21 | CN | H | H | |
| 22 | $CH_3S$ | H | H | |
| 23 | Cl | H | Br | |

EXAMPLE 24: 7-chloro-4-(2-imidazolin-2-yl-amino)-5-methyl-2,1,3-benzothiadiazole [Process variant b]

14 g of (7-chloro-5-methyl-2,1,3-benzothiadiazol-4-yl)isocyanide dichloride are dissolved in 260 cc of toluene, and 7 cc of ethylene diamine are added dropwise to the solution. The mixture is then boiled at reflux for 1 hour. The toluene is subsequently removed by distillation and the residue is taken up in 500 cc of 2 N hydrochloric acid. The solution is extracted twice with 300 cc amounts of chloroform. The aqueous phase is made weakly alkaline with caustic soda solution, and the resulting red orange precipitate is separated and washed with water. After repeated recrystallization from ethanol with the addition of some active charcoal, 7-chloro-4-(2-imidazolin-2-yl-amino)-5-methyl-2,1,3-benzothiadiazole, having a M.P. of 275–278°, is obtained.

The starting material used in this Example is obtained as follows.

15 g of 4-amino-7-chloro-5-methyl-2,1,3-benzothiadiazole are dissolved in 750 cc of 4 N hydrochloric acid whilst hot. The solution is rapidly brought to 35°, and 18 g of thiophosgene are poured into the stirred suspension. The mixture is stirred at room temperature for 2 days. The precipitate is filtered, washed with water, dried with air and is then boiled with 1 liter of cyclohexane. The solution is treated with some active charcoal and concentrated by evaporation. The yellow needle-shaped product is sufficiently pure for the next reaction (M.P. 90–92° from cyclohexane). It is dissolved in 500 cc of carbon tetrachloride. 9 g of chlorine gas are passed through this solution at 5°. The solution which is only slightly yellowish is allowed to stand at room temperature for 4 hours and is then concentrated by evaporation on a rotary evaporator. (7-chloro-5-methyl-2,1,3-benzothiadiazol-4-yl)isocyanide dichloride is obtained and is used for the above reaction without further purification.

EXAMPLE 25: 7-bromo-5-chloro-4-(2-imidazolin-2-yl-amino)-2,1,3-benzothiadiazole [Process variant e]

13 g of 5-chloro-4-(2-imidazolin-2-yl-amino)-2,1,3-benzothiadiazole are dissolved in 1.4 liters of dioxane. 8 g of potash are added to the solution, and 8.3 g of bromine are then stirred in dropwise. The originally yellow precipitate soon turns red orange. After 5 hours, 2 liters of water are added to the mixture, stirring is effected for a further 30 minutes, and filtration is then effected. The residue is washed with water, and after recrystallization from n-propanol, yields 7-bromo-5-chloro-4-(2-imidazolin-2-yl-amino-2,1,3-benzothiadiazole having a M.P. of 284–285°.

EXAMPLE 26: 7-bromo-5-chloro-4-(2-imidazolin-2-yl-amino)-2,1,3-benzothiadiazole 16.5 g of 5-chloro-4-(2-imidazolin-2-yl-amino)-2,1,3,-benzothiadiazole hydrobromide are dissolved in 250 cc of water. 8 g of bromine are stirred dropwise into this solution. After 10 minutes a green-coloured crystalline precipitate is formed. The mixture is stirred at 70°for 30 minutes, is cooled and filtered. The precipitate is dissolved in 200 cc of water and is made weakly alkaline with caustic soda solution. The resulting precipitate is filtered, washed with water, and after recrystallization from n-propanol, yields 7-bromo-5-chloro-4-(2-imidazolin-2-yl-amino)-2,1,3-benzothiadiazole having a M.P. of 284–285°.

In analogous manner to that described in Examples 1 to 4, 6 and 24, correspomding compounds of formula I are obtained from the following compounds of formula II:

| Example | $R_1$ | $R_2$ | $R_3$ | $R_4$ | M.P. |
|---|---|---|---|---|---|
| 27 | $C_2H_5$ | H | H | $NH_2$ | 219–221° |
| 28 | $CH_3$ | H | Cl | $NH_2$ | 275–280° |
| 29 | $CH_3$ | H | $CH_3$ | $NH_2$ | 285–288° |
| 30 | $CH_3$ | $CH_3$ | H | $NH_2$ | 300–307° |
| 31 | $CH_3$ | H | H | $NH_2$ | 225–228° (hydrochloride) |

The production of these compounds of formula II are effected from known starting materials as described below in the example of 4-guanidino-2,1,3-benzothiadiazole.

8 g of 4-amino-2,1,3-benzothiadiazole are dissolved in 25 cc of ethanol, and 4.5 q of cyanamide and 5 cc of concentrated hydrochloric acid are added to the resulting solution. The resulting mixture is heated to the boil at reflux for 15 hours. The mixture is then cooled to 0°and is allowed to stand at this temperature for 2 hours. The resulting precipitate is filtered off and washed with ethanol and then with ether. After recrystallization from methanol containing active charcoal, the resulting 4-guanidino-2,1,3-benzothiadiazole hydrochloride has a M.P. of 256–259°.

Using the process exemplified in the preceding paragraph and using the appropriate starting materials there are obtained the following compounds of formula II:

|   | $R_1$ | $R_2$ | $R_3$ | $R_4$ |
|---|---|---|---|---|
| a) | $CH_3O$ | H | H | $HNC_3H_7$ |
| b) | $NO_2$ | H | H | $HNC_3H_7$ |
| c) | CN | H | H | $HNC_3H_7$ |
| d) | H | H | OH | $HNC_3H_7$ |
| e) | $CH_3S$ | H | H | $HNC_3H_7$ |

What is claimed is:

1. A compound of the formula:

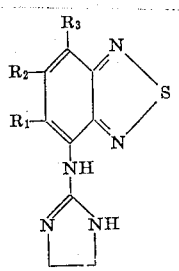

wherein each of $R_1$, $R_2$ and $R_3$, independently, is hydrogen, halogen, alkyl, alkoxy, nitro, cyano, hydroxy or alkylthio, each of the alkyl groups thereof having 1 to 4 carbon atoms,
or a pharmaceutically acceptable acid addition salt thereof.

2. The compound of claim 1, which is 7-chloro-4-(2-imidazolin-2-yl-amino)-2,1,3,-benzothiadiazole.

3. The compound of claim 1, which is 4-(2-imidazolin-2-yl-amino)-7-methyl-2,1,3-benzothiadiazole.

4. The compound of claim 1, which is 7-chloro-4-(2-imidazolin-2-yl-amino)-5-methyl-2,1,3,-benzothiadiazole.

5. The compound of claim 1, which is 5,7-dimethyl-4-(2-imidazolin-2-yl-amino)-2,1,3-benzothiadiazole.

6. The compound of claim 1, which is 5-chloro-4-(2-imidazolin-2-yl-amino)-7-methyl-2,1,3,-benzothiadiazole.

7. The compound of claim 1, which is 5,7-dichloro-4-(2-imidazolin-2-yl-amino)-2,1,3-benzolthiadiazole.

8. The compound of claim 1, which is 5,6-dimethyl-4-(2-imidazolin-2-yl-amino)-2,1,3-benzothiadiazole.

9. The compound of claim 1, which is 7-hydroxy-4-(2-imidazolin-2-yl-amino-2,1,3-benzothiadiazole.

10. The compound of claim 1, which is 5,6-dichloro-4-(2-imidazolin-2-yl-amino)-2,1,3,-benzothiadiazole.

11. The compound of claim 1, which is 6,7-dichloro-4-(2-imidazolin-2-yl-amino)-2,1,3-benzothiadazole.

12. The compound of claim 1, which is 4-(2-imidazolin-2-yl-amino)-7-methoxy-2,1,3-benzothiadiazole.

13. The compound of claim 1, which is 5-bromo-7-chloro-4-(2-imidazolin-2-yl-amino)-2,1,3-benzothiadiazole.

14. The compound of claim 1, which is 7-bromo-5-chloro-4-(2-imidazolin-2-yl-amino)-2,1,3-benzothiadiazole.

15. A compound of claim 1, wherein $R_2$ and $R_3$ are hydrogen and $R_1$ is hydrogen, halogen, alkyl alkoxy or alkylthio.

16. The compound of claim 15, which is 4-(2-imidazolin-2-yl-amino)-2,1,3-benzothiadiazole.

17. The compound of claim 15, which is 4-(2-imidazolin-2-yl-amino)-5-methyl-2,1,3-benzothiadiazole.

18. The compound of claim 15, which is 4-(2-imidazolin-2-yl-amino)-5-chloro-2,1,3-benzothiadiazole.

19. The compound of claim 15, which is 4-(2-imidazolin-2-yl-amino)-5-methoxy-2,1,3-benzothiadiazole.

20. The compound of claim 15, which is 5-ethyl-4-(2-imidazolin-2-yl-amino)-2,1,3-benzothiadiazole.

21. The compound of claim 15, which is 5-bromo-4-(2-imidazolin-2-yl-amino)-2,1,3-benzothiadiazole.

22. A compound of the formula:

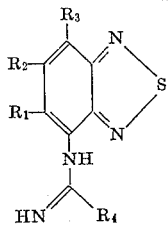

wherein $R_1$, $R_2$ and $R_3$ are as defined in claim 1, and $R_4$ is $-NH-NO_2$, $-S-R_5$, $-O-R_5$ or $-NH-R_5$ wherein $R_5$ is hydrogen or alkyl of one to three carbon atoms.

23. A compound according to claim 22, wherein $R_4$ is $-NH-R_5$ wherein $R_5$ is hydrogen or alkyl of one to three carbon atoms, or a pharmaceutically acceptable acid addition salt thereof.

24. The compound of claim 23, which is 4-quanidino-2,1,3-benzothiadiazole.

25. The compound of claim 23, which is 5-ethyl-4-guanidino-2,1,3-benzothiadiazole.

26. The compound of claim 23, which is 7-chloro-4-guanidino-5-methyl-2,1,3-benzothiadiazole.

27. The compound of claim 23, which is 5,7-dimethyl-4-guanidino-2,1,3-benzothiadiazole.

28. The compound of claim 23, which is 5,6-dimethyl-4-guanidino-2,1,3-benzothiadiazole.

29. The compound of claim 23, which is 4-guanidino-5-methyl-2,1,3-benzothiadiazole.

* * * * *